C. L. IRVING.
Car Starter and Brake.
No. 89,410.
2 Sheets—Sheet 1.
Patented April 27, 1869.
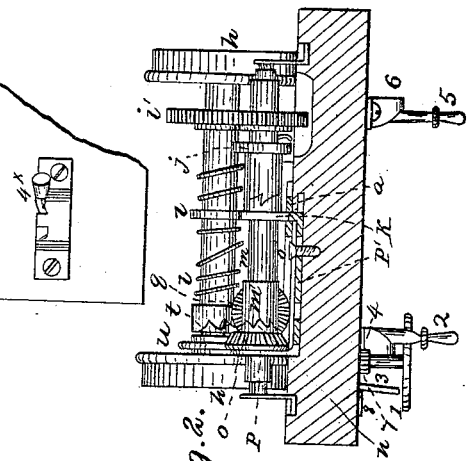
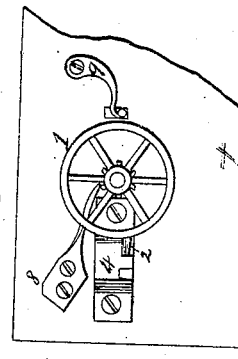
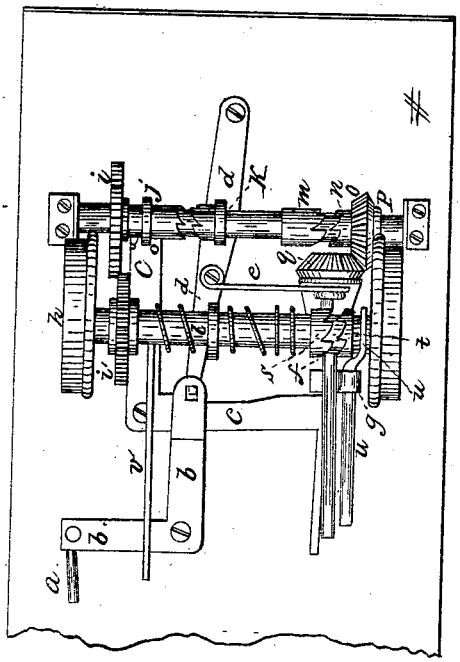
Witnesses:
Inventor:

C. L. IRVING.
Car Starter and Brake.

Patented April 27, 1869.

Witnesses:

Inventor:
C. L. Irving

CORNELIUS L. IRVING, OF INDIANAPOLIS, INDIANA.

Letters Patent No. 89,410, dated April 27, 1869.

---

IMPROVED CAR-BRAKE AND STARTER.

---

The Schedule referred to in these Letters Patent and making part of the same.

---

*To all whom it may concern:*

Be it known that I, CORNELIUS L. IRVING, of the city of Indianapolis, and State of Indiana, have invented a new and improved Car-Brake, and Starter for Street-Railway Cars.

The nature of my invention consists in the application to street-railway cars of a series of levers, that may be operated by the attendant upon the platform of the car, which levers operate certain sleeves and clutches, formed and adjusted upon shafts, one of which shafts is the rear axle, and the other being an independent shaft hung in the rear of the former. To the latter shaft is attached a chain, that passes through a flange, rigidly attached to the shaft, which chain is wound round the shaft or rear axle, and its opposite end attached to a drum, or wheel, within which drum is contained a powerful spring, that is wound up in the manner to be hereinafter described, so that when the spring is released, it will cause the wheels of the car to revolve, in a forward direction, thereby relieving the strain upon the horses, as is usual in the ordinary construction of cars.

To enable others skilled in the art to make and use this my invention, I do hereby declare the following to be a full, clear, and exact description thereof, reference being had to the annexed drawings, making a part of this specification, in which—

Figure 1 represents a bottom view of the wheels, gearing, and levers employed; and Figure 2 is a section of the same.

Figure 3 is a top view, showing the levers, or handles, and wheel, that control the braking and starting-apparatus.

Figure 4:
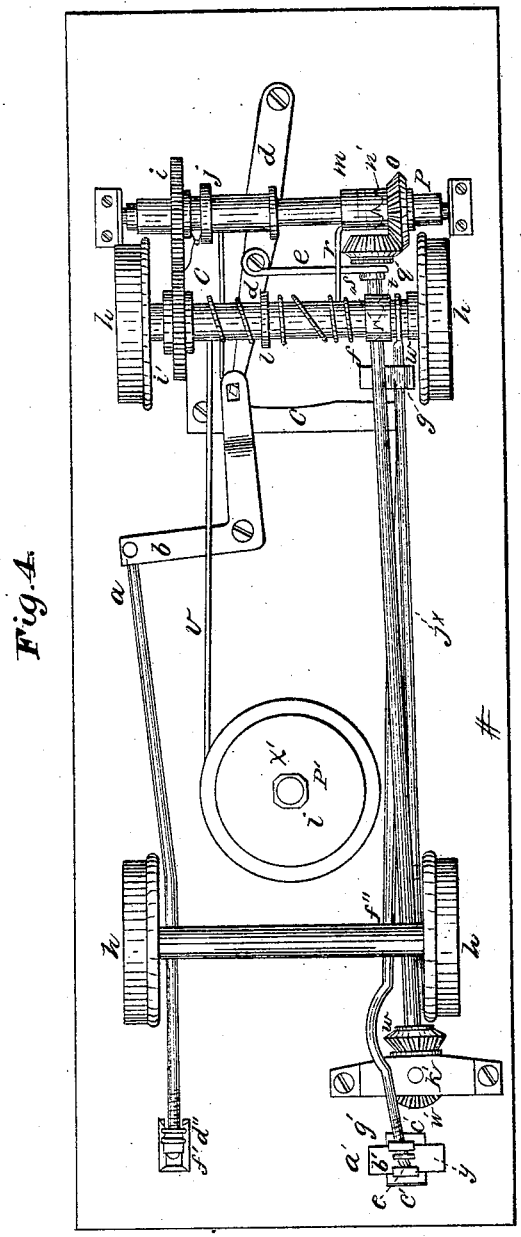
Figure 4 is an enlarged bottom view of the car, showing the location and relative positions of the different devices used.

$h\ h$ represent the wheels of a railway-car.

Upon the axle of the rear wheels there is rigidly attached the toothed wheel $i'$, and the clutch $t$.

Centrally on said axle is placed the sleeve $s$, with clutch-teeth, formed to mesh within the clutch $t$.

$l$ is a flange, formed upon the sleeve $s$, through which a hole is made, for a chain to pass.

In the rear of this axle is located another shaft, $m$, upon which is placed the gear-wheel $i$, attached to a sleeve, that revolves freely thereupon, the inner end of which sleeve being formed with teeth, that mesh with and into corresponding teeth formed upon the flange $k$, which latter are rigidly attached to the shaft.

At the end of the shaft there is a bevelled-gear wheel, $o$, attached to a sleeve, moving freely upon the shaft, on the inner end of which are teeth formed, to mesh with and into the teeth $m'$, which latter are rigidly attached to the shaft, by a flange.

$q$ is a bevelled-gear wheel, meshing into the gear-wheel $o$, upon the shaft $m$, which gear-wheel $q$ is attached to a rod, $f$, running nearly the whole length of the car, and has, upon its opposite end, the bevelled-gear wheel $w$, that plays and is operated by a corresponding bevelled-gear wheel, located beneath the plate $k'$, as seen in fig. 4.

This latter wheel is attached to the shaft of the windlass 1, so that by turning this windlass, and by means of the gear-wheels, as described and shown, the clutches $m'$ and $n$ are forced together, thereby causing the chain $v$ to be wound around the axle, or shaft $l$, and also winding up the spring enclosed in the drum, $x'$.

The windlass and its connections, as above described, are used when the car is stationary, so that a sufficient power is accumulated, after the spring is wound up, that is contained within the drum aforesaid, to start the car upon the release of the brake.

The rod $a$ is operated by means of the handle $4^\times$, fig. 3, and connects with the bent lever $b$, which in turn is connected with the lever $d$, pivoted at $+\ +$, and, by means of the rod $e$, a connection is made with the shaft $f$.

By this arrangement, the clutch $m'$ and $n$ is thrown into or out of gear, and the chain and spring wound up, the lever $p'$ being attached to the lever $d$, and having a yoke, $p$, fitting over the sleeve, and in contact with the bevelled-gear wheel $o$.

The rod $f''$ is attached to its handle 4, located in the forward part of the car, and its opposite end is connected with the bent lever $c\ c$, the rear end of which is bent up, and forked, in such a manner as to embrace the flange $f$, formed upon the sleeve of the rear shaft $m$, and thus the clutch, as shown in fig. 1, is thrown in and out of gear.

$g^\times$ is a rod running from the platform of the car, operated by the foot of the brakeman, and held in position by a dog, $g$, or by ratchet-teeth.

This rod, at its opposite end, by means of a yoke, embraces the clutch upon the sleeve $t$, so that when operated, it will form a connection with its counterpart, $s$, and place the same either in or out of gear.

The wheels $i$ and $i'$ are always in gear, that is, they are, by means of the rods and levers heretofore referred to, adjusted so that the cogs upon the two wheels may be wholly or only a part in contact, which is considered a great desideratum in this connection, for if they were at any portion of time entirely disconnected from each other, when they are desired to be forced into gear again there would be a tendency to break the cogs.

It will be noticed, that when the several clutches are thrown into gear, the weight of the car will cause the spring and chain to be wound up, after stopping, and, throwing the clutches out of gear, the starting-apparatus is put into operation.

What I claim as my invention, and desire to secure by Letters Patent, is—

1. A car-brake and starter for street-railway cars, when constructed and arranged in the manner and for the purpose herein described.

2. The combination and arrangement of the windlass 1, rod $f$, bevelled-gear wheels $o$ and $q$, $w$ and $w'$, in the manner and for the purpose herein described.

3. The combination and arrangement of the handle $4^\times$ with the rod $a$, levers $b$ $d$ $p'$, and rod $e$, in the manner and for the purpose herein described.

4. The combination and arrangement of the handle 4 with the rod $f'$, lever $c$, and flange $f$, and its sleeve, on the shaft $m$, in the manner and for the purpose herein described.

5. The combination and arrangement of the rod $g^\times$ with its yoke $u$, clutch-sleeve $t$, and dog, or ratchet $g$, sleeve and clutch $s$, chain $v$, and drum $x'$, and its spring, in the manner and for the purpose herein described.

6. The combination and arrangement of the drum $x'$, with an enclosed spring, the chain $v$, shafts $l$ and $m$, clutches $s$, $t$, $m'$, and $n$, in the manner and for the purpose herein described.

C. L. IRVING.

Witnesses:
B. F. JAMES,
J. C. LATHROP.